United States Patent
Kim et al.

(10) Patent No.: US 9,031,027 B2
(45) Date of Patent: May 12, 2015

(54) METHOD AND APPARATUS FOR ALLOCATING FEEDBACK CHANNELS IN WIRELESS COMMUNICATION SYSTEM

(71) Applicant: Samsung Electronics Co., Ltd, Gyeonggi-do (KR)

(72) Inventors: Sang-Heon Kim, Gyeonggi-do (KR); Hee-Won Kang, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 170 days.

(21) Appl. No.: 13/852,921

(22) Filed: Mar. 28, 2013

(65) Prior Publication Data

US 2013/0258970 A1    Oct. 3, 2013

(30) Foreign Application Priority Data

Mar. 28, 2012   (KR) ................. 10-2012-0031617

(51) Int. Cl.
*H04W 4/00*    (2009.01)
*H04W 72/04*   (2009.01)
*H04L 1/00*    (2006.01)
*H04L 5/00*    (2006.01)

(52) U.S. Cl.
CPC ............ *H04W 72/04* (2013.01); *H04L 1/0025* (2013.01); *H04L 1/0028* (2013.01); *H04L 1/0073* (2013.01); *H04L 5/0053* (2013.01)

(58) Field of Classification Search
None
See application file for complete search history.

(56) References Cited

U.S. PATENT DOCUMENTS

2009/0154412 A1* 6/2009 Wang et al. ............... 370/329
2010/0056067 A1* 3/2010 Kim et al. .................. 455/69

* cited by examiner

*Primary Examiner* — Afshawn Towfighi

(57) ABSTRACT

A base station determines quantities of information to be fed back by a mobile terminal using each of a first feedback channel and a second feedback channel, generates feedback control information used for determining a coding rate based on the determined quantities of information for each of the first feedback channel and the second feedback channel, and transmits, to the mobile terminal, a feedback channel allocation message containing the feedback control information and information on the first feedback channel and the second feedback channel.

20 Claims, 5 Drawing Sheets

METHOD AND APPARATUS FOR ALLOCATING FEEDBACK CHANNELS IN WIRELESS COMMUNICATION SYSTEM

CROSS-REFERENCE TO RELATED APPLICATION(S) AND CLAIM OF PRIORITY

The present application is related to and claims the priority under 35 U.S.C. §119(a) to Korean Application Serial No. 10-2012-0031617, which was filed in the Korean Intellectual Property Office on Mar. 28, 2012, the entire content of which is hereby incorporated by reference.

TECHNICAL FIELD

The present disclosure relates generally to a method and an apparatus for allocating feedback channels in a wireless communication system.

BACKGROUND

An IEEE 802.16m communication system which is a representative communication system based on Orthogonal Frequency Division Multiple Access (hereinafter, referred to as "OFDMA") has a small information quantity and provides a feedback channel which can transmit an MAC header and an MAC control message for transmitting larger capacity feedback information as well as a fast feedback channel having a fixed physical structure.

In Order to instruct a mobile terminal to allocate and release the feedback channel, a feedback channel allocation message was used in the prior art. The feedback channel allocation message is used for allocating two feedback channels, that is, a long period feedback channel and a short period feedback channel to the mobile terminal.

Transmission times of feedback information between the long period channel and the short period feedback channel are different from each other. That is, the feedback information of the short period feedback channel is not transmitted at the time when the feedback information of the long period feedback channel is transmitted, and the feedback information of the long period feedback channel is not transmitted at the time when the feedback information of the short period feedback channel is transmitted.

Meanwhile, the conventional feedback channel allocation message contains only one information such as a resource index indicating a size and a position of the allocated resource, a Multiple Input Multiple Output (MIMO) transmission type, or an offset (hereinafter, referred to as "$I_{sizeoffset}$") used for calculating a buffer size index without regard to the long terminal feedback channel and the short period feedback channel.

Accordingly, even through information quantities to be transmitted using the long period feedback channel and the short period feedback channel are different, resources at the same position and having the same size are allocated to the long period feedback channel and the short period feedback channel, and transmission types used for the long period feedback channel and the short period feedback channel are the same.

Meanwhile, the IEEE 802.16m communication system determines a buffer size and a coding rate by two parameters of Resource Index and $I_{sizeoffset}$. Using the same parameter for the long period feedback channel and the short period feedback channel means that zero padding should be performed to make the feedback channels have the same buffer size and the feedback information should be transmitted using the same coding rate even though information quantities to be transmitted are different.

Accordingly, when the same resource is allocated to the long period feedback channel and the short period feedback channel, the coding rate of the feedback channel having the small feedback information quantity to be transmitted unnecessarily becomes higher than an actually required coding rate.

Particularly, the long period feedback channel is used for transmitting information having higher importance in comparison with the short period feedback channel, and the information quantity transmitted through the long period feedback channel is generally small, which requires a solution to solve the above problems.

SUMMARY

It is a primary object to provide a method and an apparatus for allocating feedback channels in a wireless communication system.

The present disclosure provides a method and an apparatus which efficiently use radio resources in allocating two feedback channels for transmitting information having different sizes by using one downlink control signal in a wireless communication system using an uplink feedback channel.

In accordance with an aspect of the present disclosure, a method of allocating feedback channels by a base station in a wireless communication system is provided. The method includes determining quantities of information to be fed back by a mobile terminal using each of a first feedback channel and a second feedback channel; generating feedback control information used for determining a coding rate based on the determined quantities of information for each of the first feedback channel and the second feedback channel; and transmitting, to the mobile terminal, a feedback channel allocation message including the feedback control information and information on the first feedback channel and the second feedback channel.

In accordance with another aspect of the present disclosure, a method of transmitting feedback information by a mobile terminal in a wireless communication system is provided. The method includes receiving, from a base station, a feedback channel allocation message including feedback control information and information on a first feedback channel and a second feedback channel; and transmitting feedback information to the base station by using the feedback channel allocation message, wherein the feedback control information is used for determining a coding rate based on quantities of information to be fed back by the mobile terminal using each of the first feedback channel and the second feedback channel.

In accordance with another aspect of the present disclosure, a base station in a wireless communication system is provided. The base station includes a controller configured to determine quantities of information to be fed back by a mobile terminal using each of a first feedback channel and a second feedback channel, and to generate feedback control information used for determining a coding rate based on the determined quantities of information for each of the first feedback channel and the second feedback channel; and a transmitter configured to transmit, to the mobile terminal, a feedback channel allocation message including the feedback control information and information on the first feedback channel and the second feedback channel.

In accordance with another aspect of the present disclosure, a mobile terminal in a wireless communication system is provided. The mobile terminal includes a receiver configured to receive, from a base station, a feedback channel allocation message containing feedback control information and information on a first feedback channel and a second feedback channel from a base station; and a transmitter for transmitting feedback information to the base station by using the feedback channel allocation message, wherein the feedback control information is used for determining a coding rate based on an information quantity to be fed back by the mobile terminal using each of the first feedback channel and the second feedback channel.

The present disclosure has an effect of improving a reception capability in a wireless communication system by determining a buffer size and a coding rate in consideration of quantities of transmission information of two feedback channels. Also, the present disclosure has an effect of providing high reliability to a feedback channel transmitting information having higher importance.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless technologies. Hereinafter, an operation principle of the present disclosure will be described in detail with reference to the accompanying drawings. In the following description of the present disclosure, a detailed description of known functions and configurations incorporated herein will be omitted when it may make the subject matter of the present disclosure rather unclear. Then, terms described later are defined in consideration of the functions of the present disclosure, but may vary according to the intention or convention of a user or operator. Therefore, its definition will be made based on the overall contents of this specification.

The present disclosure provides a method and an apparatus for allocating feedback channels in a wireless communication system. More specifically, the present disclosure relates to a method and an apparatus for allocating uplink feedback channels used for feeding back information on a downlink channel from a mobile terminal to a base station in an Orthogonal Frequency Division Multiple Access (hereinafter, referred to as "OFDMA") system.

Hereinafter, a structure of a wireless communication system according to an embodiment of the present disclosure will be described with reference to FIG. 1.

Figure 1:
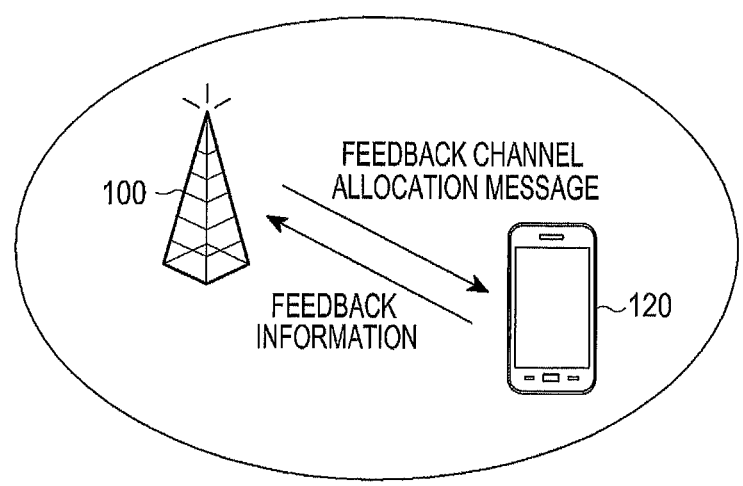
FIG. 1 illustrates a structure of a wireless communication system according to an embodiment of the present disclosure.

FIG. 1 illustrates the structure of the wireless communication system according to an embodiment of the present disclosure.

Referring to FIG. 1, the wireless communication system according to an embodiment of the present disclosure includes a base station 100 and a mobile terminal 120.

The base station 100 allocates at least one of a long period feedback channel (hereinafter, referred to as an "L feedback channel") and a short period feedback channel (hereinafter, referred to as an "S feedback channel") to the mobile terminal 120 by using a feedback channel allocation message. Although it is described that the feedback channel is divided into two channels such as the L feedback channel and the S feedback channel according to a feedback period length in an embodiment of the present disclosure, the feedback channel may be divided into three or more channels and a division reference thereof can be variously changed.

The mobile terminal 120 receives the feedback channel allocation message from the base station 100. Further, the mobile terminal 120 determines a feedback channel allocated to the mobile terminal 120, a feedback period, information to be fed back through the corresponding feedback channel, an information quantity and the like by using information contained in the feedback channel allocation message. In addition, the mobile terminal 120 transmits feedback information to the base station 100 by using the allocated feedback channel for the corresponding feedback period.

Meanwhile, the feedback channel allocation message can be configured in a form as shown in Table 1 below. The feedback channel allocation message has a configuration similar to, for example, a format of feedback polling A-MAP IF provided by IEEE 802.16m/D12

TABLE 1

| Syntax | Size (bits) | Notes |
|---|---|---|
| Feedback_Polling_A-MAP_IE( ){ | | |
|   A-MAP IE Type | 4 | Feedback Polling A-MAP IE |
|   Polling_sub_type | 1 | 0b0: uplink resource allocation or de-allocation. 0b1: feedback mode allocation or de-allocation. |
|   if (Polling_sub_type == 0b0){ | | |
|     Allocation Duration (d) | 3 | The allocation is valid for $2^{(d-1)}$ superframes starting from the superframe defined by allocation relevance. If d == 0b000, the pre-scheduled feedback transmission is released. If d == 0b111, the pre-scheduled feedback transmission shall be valid until the ABS commands to release it. |
|     if (d ==0b000){ | | Feedback de-allocation |
|       Resource Index | 11 | Confirmation of the resource index for a previously assigned persistent resource that has been deallocated<br>512 FFT size: 0 in first 2 MSB bits + 9 bits for resource index<br>1024 FFT size: 11 bits for resource index<br>2048 FFT size: 11 bits for resource index<br>Resource index includes location and allocation size |
|       HFA | 6 | HARQ feedback channel allocation for Feedback Channel De-allocation confirmation |
|       Reserved | 15 | |
|     } else if (d I=0b000){ | | Feedback allocation |
|       $I_{SizeOffset}$ | 5 | Offset used to compute burst size index |
|       Resource Index | 11 | Confirmation of the resource index for a previously assigned persistent resource that has been deallocated<br>512 FFT size: 0 in first 2 MSB bits + 9 bits for resource index<br>1024 FFT size: 11 bits for resource index<br>2048 FFT size: 11 bits for resource index<br>Resource index includes location and allocation size |
|       MEF | 1 | MIMO encoder format for uplink feedback transmission<br>Non-adaptive precoding shall be used at the AMS.<br>0b0: SFBC<br>0b1: VE with $M_t = 2$, or $M_t = 1$ if AMS has 1 transmit antenna |
|       Long TTI Indicator | 1 | Indicates number of AAI subframes spanned by the allocated resource.<br>0b0: AAI subframe (default)<br>0b1: 4 UL AAI subframes for FDD or all UL AAI subframes for TDD<br>If number of DL AAI subframes, $D_i$ is less than number of UL AAI subframes, U, Long TTI Indicator = 0b1 |
|       HFA | 3 | HARQ feedback channel allocation |
|       ACID | 4 | HARQ channel identifier |
|       MFM_allocation_index | 2 | 0b00: MFM 0 with Measurement Method Indication = 0b0<br>0b01: MFM 3 with all subbands<br>0b10: MFM 6 with all subbands<br>0b11: MFM is defined in Feedback Polling A-MAP IE with Polling_sub-type = 0b1 |
|       $MaxM_t$ | | 0b0: 1<br>0b1: 2 for MFM0, or<br>$\min(N_t,N_y)$ for MFM3, or<br>$\min(N_t,4)$ for MFM6.<br>This field shall be ignored if MFM_allocation_index == 0b11 |
|       Period | 4 | Resource is allocated at frames designated by every short and long period. The short feedback period is p frames. The long feedback period is q superframes. The first allocation shall start two frames later. The AAI subframe index is defined as in 16.2.14.2.2 and the AAI frame index is given by i + 2, where i is the index of the frame where the Feedback Polling A-MAP IE is transmitted.<br>The feedback of MIMO feedback modes in MFM_allocation_index is allocated on the short period. The feedback of the transmit correlation matrix is allocated on the long period if q > 0. Short and long period reports shall start at the first allocation. When short and long period feedback reports coincide in the same frame, long period |

TABLE 1-continued

| Syntax | Size (bits) | Notes |
|---|---|---|
| | | feedback content shall be sent in the same burst. |
| | | 0b0000: p = 1, q = 0 |
| | | 0b0001: p = 2, q = 0 |
| | | 0b0010: p = 4, q = 0 |
| | | 0b0011: p = 8, q = 0 |
| | | 0b0100: p = 16, q = 0 |
| | | 0b0101: p = 1, q = 1 |
| | | 0b0110: p = 2, q = 1 |
| | | 0b0111: p = 1, q = 2 |
| | | 0b1000: p = 2, q = 2 |
| | | 0b1001: p = 4, q = 2 |
| | | 0b1010: p = 1, q = 4 |
| | | 0b1011: p = 2, q = 4 |
| | | 0b1100: p = 4, q = 4 |
| | | 0b1101: p = 0, q = 1 |
| | | 0b1110: p = 0, q = 4 |
| | | 0b1111: p = 0, q = 16 |
| } | | |
| }else{ | | Polling_sub_type == 0b1 |
| ACK Allocation Flag | 1 | |
| if (ACK Allocation Flag == 0b1) | | |
| HFA | 6 | HARQ feedback channel allocation to acknowledge the successful detection of this IE. |
| } | | |
| Allocation Duration (d) | 3 | The allocation is valid for $2^{(d-1)}$ superframes starting from the superframe defined by allocation relevance. If d == 0b000, the pre-scheduled feedback transmission is released. If d == 0b111, the pre-scheduled feedback transmission shall be valid until the ABS commands to release it. |
| if (d ==0b000){ | | Feedback de-allocation |
| Polling_deallocation_bitmap | 3 | |
| } else { | | Feedback allocation |
| MIMO_feedback_IE_type | 1 | 0b0: feedback allocation for single-BS MIMO operation |
| | | 0b1: feedback allocation for multi-BS MIMO operation |
| if (MIMO_feedback_IE_type == 0b0){ | | Single-BS MIMO feedback request |
| MFM_bitmap | 8 | Maximum of 3 distinct concurrent MFM are allowed with MFM_bitmap. |
| | | If a currently allocated MFM is indicated in the MFM_bitmap, it indicates a deallocation and reallocation of this MFM. ACK Allocation Flag shall be set to 0b1 in this case. |
| Period | 4 | Resource is allocated at frames designated by every short and long period. The short feedback period is p frames. The long feedback period is q superframes. The first allocation shall start two frames later. The AAI subframe index is defined as in 16.2.17.2.2 and the AAI frame index is given by i+2, where i is the index of the frame where the Feedback Polling A-MAP IE is transmitted. |
| | | The feedback of MIMO feedback modes in MFM_allocation_index is allocated on the short period. The feedback of the transmit correlation matrix is allocated on the long period if q > 0. Short and long period reports shall start at the first allocation. When short and long period feedback reports coincide in the same frame, long period feedback content shall be sent in the same burst. |
| | | 0b0000: p = 1, q = 0 |
| | | 0b0001: p = 2, q = 0 |
| | | 0b0010: p = 4, q = 0 |
| | | 0b0011: p = 8, q = 0 |
| | | 0b0100: p = 16, q = 0 |
| | | 0b0101: p = 1, q = 1 |
| | | 0b0110: p = 2, q = 1 |
| | | 0b0111: p = 1, q = 2 |
| | | 0b1000: p = 2, q = 2 |
| | | 0b1001: p = 4, q = 2 |
| | | 0b1010: p = 1, q = 4 |
| | | 0b1011: p = 2, q = 4 |
| | | 0b1100: p = 4, q = 4 |
| | | 0b1101: p = 0, q = 1 |
| | | 0b1110: p = 0, q = 4 |
| | | 0b1111: p = 0, q = 16 |

TABLE 1-continued

| Syntax | Size (bits) | Notes |
|---|---|---|
| if (LSB #0 in MFM_bitmap == 1){ | | MFM 0 |
|     MaxM$_t$ | 1~2 | |
|     Measurement Method Indication | 1 | 0b0: Use the midamble for CQI measurements<br>0b1: Use pilots in OL region with MaxM$_t$ streams for CQI measurements |
| } | | |
| if (LSB #2 in MFM_bitmap == 1){ | | MFM 2 |
|     MaxM$_t$ | 1~2 | |
|     Measurement Method Indication | 1 | 0b0: Use the midamble for CQI measurements<br>0b1: Use pilots in OL region with MaxM$_t$ streams for CQI measurements |
| } | | |
| If (LSB #3 in MFM_bitmap == 1){ | | MFM 3 |
|     MaxM$_t$ | 1~2 | |
| } | | |
| If (LSB #4 in MFM_bitmap == 1){ | | MFM 4 |
|     MaxM$_t$ | 1~2 | |
| } | | |
| If (LSB #5 in MFM_bitmap == 1){ | | MFM 5 |
|     MaxM$_t$ | 1~2 | |
|     Measurement Method Indication | 1 | 0b0: Use the midamble for CQI measurements<br>0b1: Use pilots in OL region with MaxM$_t$ streams for CQI measurements |
| } | | |
| If (LSB #6 in MFM_bitmap == 1){ | | MFM 6 |
|     MaxM$_t$ | 1~2 | |
| } | | |
| If (LSB #7 in MFM_bitmap == 1){ | | MFM7 |
|     MaxM$_t$ | 1~2 | |
| } | | |
| If (LSB #2 in MFM_bitmap == 1) or (LSB #3 in MFM_bitmap == 1) or (LSB #5 in MFM_bitmap == 1) or (LSB #6 in MFM_bitmap == 1)){ | | MFM 2, 3, 5, 6 |
|     Num_best_subbands | 2 | 0b00: report all subbands<br>0b01: 1 best subband<br>0b10: min{6, Y$_{SB}$} best subbands<br>0b11: min{12, Y$_{SB}$} best subbands<br>1 <= Num_best_subbands <= Y$_{SB}$ |
| } | | |
| If (LSB #3 in MFM_bitmap == 1) or (LSB #4 in MFM_bitmap == 1) or (LSB #6 in MFM_bitmap == 1) or (LSB #7 in MFM_bitmap == 1)){ | | MFM 3, 4, 6, 7 |
|     If (q = 0) { | | |
|     Codebook_coordination | 1 | 0b0: base mode with codebook coordination disabled<br>0b1: base mode with codebook coordination enabled |
|     } | | |
|     If (N$_t$ == 4){ | | |
|     Codebook_subset | 1 | 0b0: report RMI from the base codebook or transformed base codebook<br>0b1: report PMI from codebook subset or transformed codebook subset |
|     } | | |
| } | | |
| }else{ | | Multi-BS MIMO feedback request |
|   Period (p) | 3 | |
|   TRU | 2 | Target RU indicating which RUs or which type of RU to work on for feedback<br>0b00: Latest best subbands reported for single BS MIMO<br>0b01: Whole bandwidth<br>0b10: FFR partition 0<br>0b11: boosted FFR partition |
|   ICT | 2 | 0b00: PMI restriction for single-BS precoding;<br>0b01: PMI recommendation for single-BS precoding;<br>0b10: CL-MD for mulfi-BS precoding;<br>0b11: Co-MIMO for multi-BS precoding: |

TABLE 1-continued

| Syntax | Size (bits) | Notes |
|---|---|---|
| if (N$_t$ == 4){ Codebook_subset | 1 | 0b0: report PMI from the base codebook<br>0b1: report PMI from codebook subset |
| }<br>N_multiBS_reports<br>if (ICT == 0b11){ | 3 | Indicates the number of reports |
| MaxUser | 2 | Maximum number of users supported in Co-MIMO in the same resource.<br>0b00: 2 users<br>0b01: 3 users<br>0b10: 4 users<br>0b11: reserved |
| }<br>}<br>}<br>Padding<br>}<br>} | Variable | To reach 40-bit assignment A-MAP IE size |

*A 16 bit CRC is generated based on the randomized contents of the Feedback Polling A-MAP IE. The CRC is masked by the 16-bit CRC mask generated according to Table 843.

The feedback channel allocation message contains the following information as shown in Table 1 above.
  A MAP IE Type: indicates a feedback allocation message.
  polling_sub_type: indicates allocation or release of uplink resources and allocation or release of feedback modes.
  Allocation duration (d): indicates information on a period where feedback information is transmitted. It continues for a super frame period. When d=0b000, it means release of a feedback channel. When d=0b111, it means that transmission of the feedback information continues until the base station transmits a release instruction.
  Resource Index: indicates uplink resource information to be used for transmitting the feedback information.
  HFA: indicates a Hybrid Automatic Repeat request (Hybrid ARQ) feedback channel index.
  $I_{SizeOffset}$: indicates an offset used for calculating a buffer size.
  MEF: indicates an MIMO encoding format to be used when the mobile terminal transmits the feedback information.
  Long TTI indicator: indicates the number of sub frames determined by the allocated resources.
  ACID: indicates a Hybrid ARQ feedback channel identifier.
  MFM_bitmap/MFM_allocation_index: indicates a type of information to be transmitted by the mobile terminal.
  MaxMt: indicates a maximum Space Time Code (STC) rate which the mobile terminal can feedback in a Single User (SU)-MIMO and the maximum number of users who share the same resource in a Multi User (MU)-MIMO.
  Period: indicates a feedback transmission period (designates the L feedback channel and the S feedback channel).
  Num_best_subbands: indicates the number of best subbands for the feedback.
  Measurement Method Indication: indicates a Channel Quality Information (CQI) measurement method (indicates whether a midamble or a pilot is used for the CQI measurement).
  Codebook_subset: indicates whether a type of codebook transmitted by the mobile terminal is a base codebook or a codebook subset.
In order to efficiently allocate the feedback channels by using the feedback channel allocation message, the embodiment of the present disclosure provides a scheme of, based on information quantities to be fed back through the L feedback channel and the S feedback channel (hereinafter, referred to as "transmission information quantitiesy"), using both of Resource Index (hereinafter, referred to as a "resource index") corresponding to resource allocation information contained in the feedback channel message and $I_{sizeoffset}$ (hereinafter, referred to as a "buffer size offset value") for a large transmission information quantity and using the Resource Index and the transmission information quantity of the corresponding feedback channel for a small transmission information quantity.

Meanwhile, the transmission information quantities of the L feedback channel and the S feedback channel can be determined by the base station 100 and the mobile terminal 120, respectively, based on the information contained in the feedback channel allocation message shown in Table 1. For example, feedback information to be transmitted through the corresponding feedback channel can be determined based on MFM-bitmap and MFM_allocation_Mdex in Table 1, and information on the MIMO mode to be fed back through the corresponding feedback channel and information on the number of subbands to be transmitted can be determined based on MaxMt and Num_best_subbands. Further, a type of fed back information and a type of transmitted feedback information are determined, that is, it is determined whether the type is an MAC header or an MAC control message based on the remaining information contained in the feedback channel allocation message. As a result, the transmission information quantity of information to be fed back can be accurately predicted.

Accordingly, when both the L feedback channel and the S feedback channel are allocated through the feedback channel allocation message, the base station 100 and the mobile terminal 120 can determine the transmission information quantities of both the L feedback channel and the S feedback channel.

The base station 100 compares the transmission information quantities of the L feedback channel and the S feedback channel to determine the resource index and the buffer size offset value based on the feedback channel having a larger transmission information quantity and inserts the determined resource index and buffer size offset value into the feedback channel allocation message to transmit the feedback channel allocation message to the mobile terminal 120.

Accordingly, the determined resource index and buffer size offset value can be used for the feedback channel having the larger transmission information quantity, and the determined resource index and the transmission information quantity of the corresponding feedback channel are used for the feedback channel having the smaller transmission information quantity without using the buffer size offset value.

In the prior art, the same resource index and the same buffer size offset value are used for both the L feedback channel and the S feedback channel. Since the resource index and the buffer size offset value determine a buffer size and a coding rate, the prior art has a problem in that the buffer size and the coding rate are always set to be the same value and then used. Accordingly, even though information quantities to be transmitted through the L feedback channel and the S feedback channel are different, zero padding which makes the buffer sizes have the same value is performed and the same coding rate is always used.

Therefore, the embodiment of the present disclosure provides a method and an apparatus which allow different buffer sizes and coding rates to be set and used in accordance with transmission quantities of the L feedback channel and the S feedback channel.

In general, since the transmission information quantity of the L feedback channel is smaller than the transmission information quantity of the S feedback channel and resource sizes required for the L feedback channel and the S feedback channel are the same, a reception capability can be improved when the coding rate decreases. Further, when the coding rate decreases by considering that the information transmitted through the L feedback channel has larger importance than the information transmitted through the S feedback channel, a totally improved capability can be expected.

Accordingly, unlike the prior art using the same coding rate for the L feedback channel and the S feedback channel, the embodiment of the present disclosure provides a method and an apparatus which use a lower coding rate for the feedback channel corresponding to the small transmission information quantity so as to provide higher reliability to the feedback channel having the larger importance.

Hereinafter, a process in which the base station allocates the feedback channels according to an embodiment of the present disclosure will be described with reference to FIG. 2.

Figure 2:
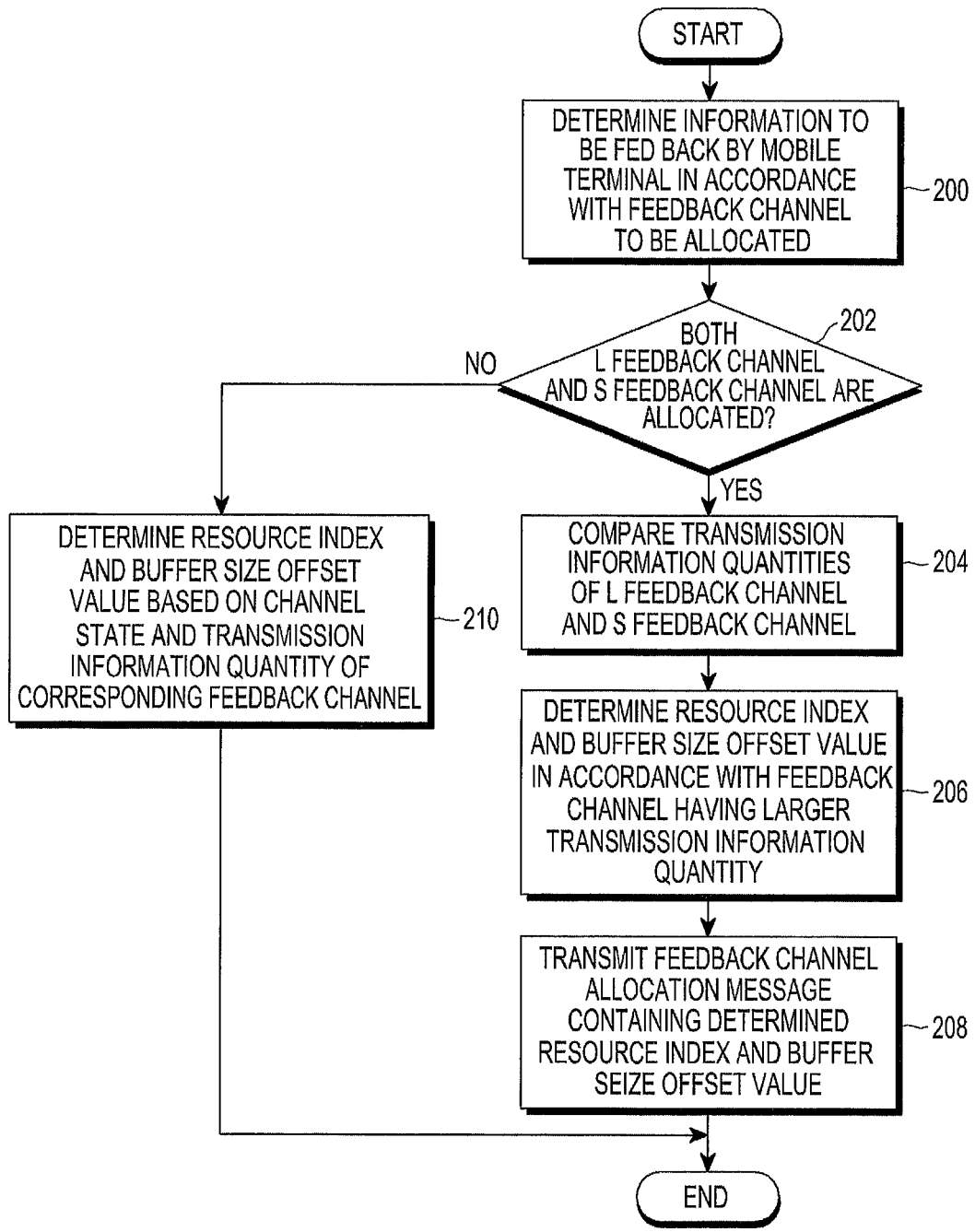
FIG. 2 is a flowchart illustrating a feedback channel allocating process by a base station according to an embodiment of the present disclosure.

FIG. 2 is a flowchart illustrating a feedback channel allocating process by the base station according to an embodiment of the present disclosure.

Referring to FIG. 2, the base station determines information to be fed back by the mobile terminal in accordance with the feedback channel to be allocated in step 200. Here, the base station can determine the information to be fed back by the mobile terminal by determining one of a plurality of feedback modes determined according to the information to be fed back as a feedback mode for the mobile terminal.

The base station determines whether to allocate both the L feedback channel and the S feedback channel as the feedback channel to be allocated in step 202. When both the L feedback channel and the S feedback channel are allocated, the base station compares the transmission information quantity of the L feedback channel and the transmission information quantity of the S feedback channel in step 204. Further, the base station determines a resource index and a buffer size offset value in accordance with the feedback channel having the larger transmission information quantity in step 206.

For example, when the transmission information quantity of the L feedback channel is larger than the transmission information quantity of the S feedback channel, the base station determines the resource index and the buffer size offset value based on the transmission information quantity of the L feedback channel. Alternatively, when the transmission information quantity of the S feedback channel is larger than the transmission information quantity of the L feedback channel, the base station determines the resource index and the buffer size offset value based on the transmission information quantity of the S feedback channel.

When the resource index and the buffer size offset value are determined, the base station proceeds to step 208 to insert the determined resource index and buffer size offset value into the feedback channel allocation message and transmit the feedback channel allocation message to the mobile terminal.

Meanwhile, when both the L feedback channel and the S feedback channel are not allocated in step 202, that is, when one of the L feedback channel and the S feedback channel is allocated, the base station determines the resource index and the buffer size offset-value based on a channel state and the transmission information quantity of the corresponding feedback Channel in step S210 and then performs step 208.

Next, a process in which the base station transmits the feedback channel allocation message and then receives feedback information from the mobile terminal will be described with reference to FIG. 3.

Figure 3:
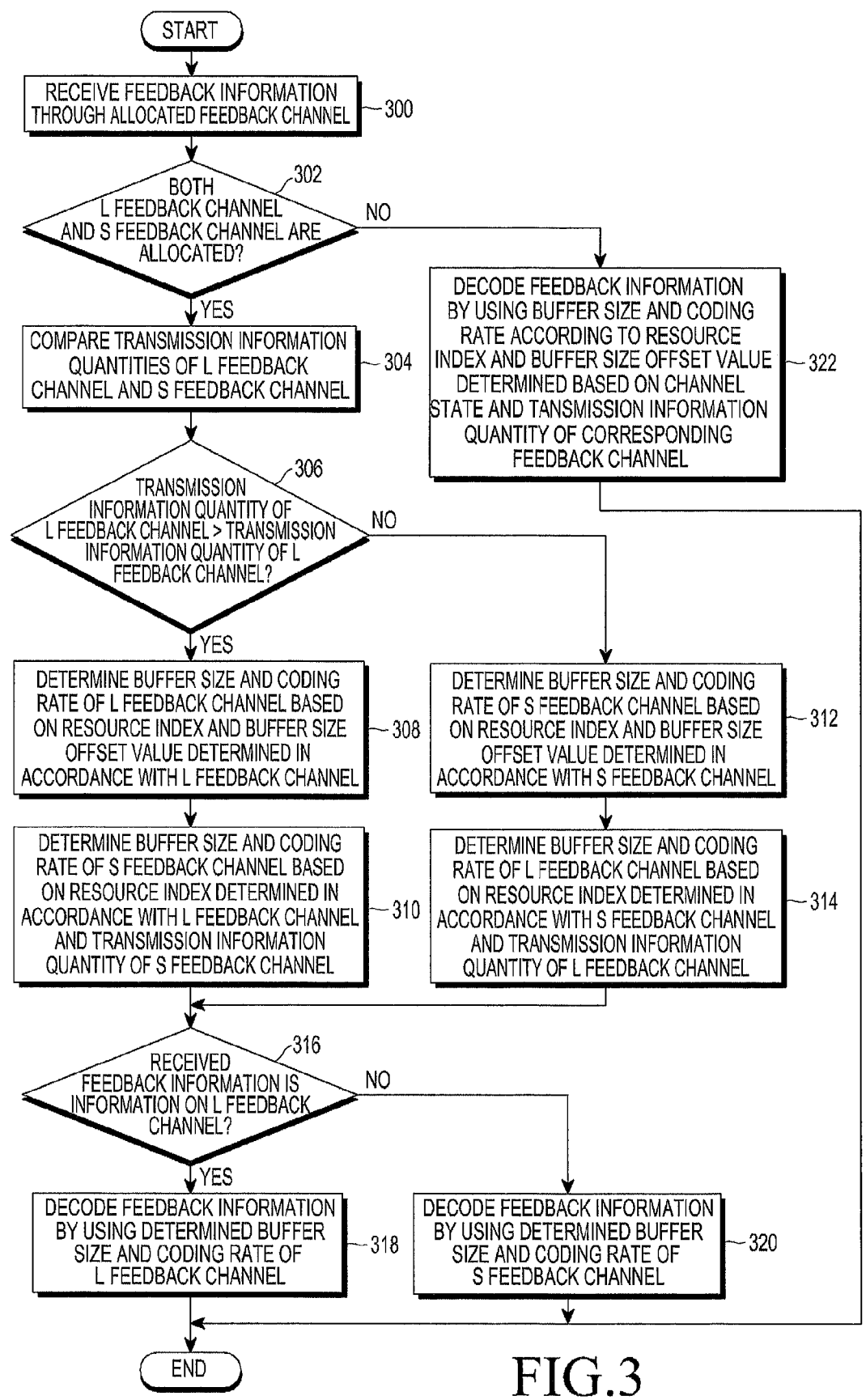
FIG. 3 is a flowchart illustrating a feedback information receiving process by a base station according to an embodiment of the present disclosure.

FIG. 3 is a flowchart illustrating a feedback information receiving process by the base station according to an embodiment of the present disclosure.

Referring to FIG. 3, the base station receives feedback information from the mobile terminal through an allocated feedback channel in step 300. Further, the base station determines whether both the L feedback channel and the S feedback channel are allocated to the mobile terminal in step 302.

When both the L feedback channel and the S feedback channel are allocated, the base station proceeds to step 304 and compares the transmission information quantity of the L feedback channel and the transmission information quantity of the S feedback channel. Further, the base station determines whether the transmission information quantity of the L feedback channel is larger than the transmission information quantity of the S feedback channel in step 306.

When the transmission information quantity of the L feedback channel is larger than the transmission information quantity of the S feedback channel, the base station determines a buffer size and a coding rate of the L feedback channel based on the resource index and buffer size offset value determined in accordance with the L feedback channel in step 308. Subsequently, the base station determines a buffer size and a coding rate of the S feedback channel based on the resource index determined in accordance with the L feedback channel and the transmission information quantity of the S feedback channel in step 310.

Meanwhile, when the transmission information quantity of the L feedback channel is not larger than the transmission information quantity of the S feedback channel, the base station determines a buffer size and a coding rate of the S feedback channel based on the resource index and buffer size offset value determined in accordance with the S feedback channel in step 312. Further, the base station proceeds to step 314 and determines the buffer size and the coding rate of the L feedback channel based on the resource index determined in accordance with the S feedback channel and the transmission information quantity of the L feedback channel.

The base station determines whether the received feedback information is information of the L feedback channel fed back through the L feedback channel in step 316. When the received feedback information is the information of the L feedback channel, the base station decodes the received feedback information by using the determined buffer size and coding rate of the L feedback channel in step 318.

When the received feedback information is not the information of the L feedback channel, that is, when the received feedback information is information of the S feedback channel, the base station decodes the received feedback information by using the determined buffer size and coding rate of the S feedback channel in step 320.

Meanwhile, when both the L feedback channel and the S feedback channel are not allocated in step 302, that is, when one of the L feedback channel and the S feedback channel is allocated, the base station proceeds to step 322 and decodes the received feedback information by using the buffer size and the coding rate according to the resource index and buffer size offset value determined based on the channel state and the transmission information quantity of the corresponding feedback channel.

The process of FIG. 3 can be repeatedly performed for the transmission period of the feedback information. Further, since the base station has already compared the transmission information quantity of the L feedback channel and the transmission information quantity of the S feedback channel by performing step 204 of FIG. 2, the process of step 306 of FIG. 3 can be omitted.

Next, a process in which the mobile terminal receives the feedback channel allocation message and transmits the feedback information will be described with reference to FIG. 4.

Figure 4:
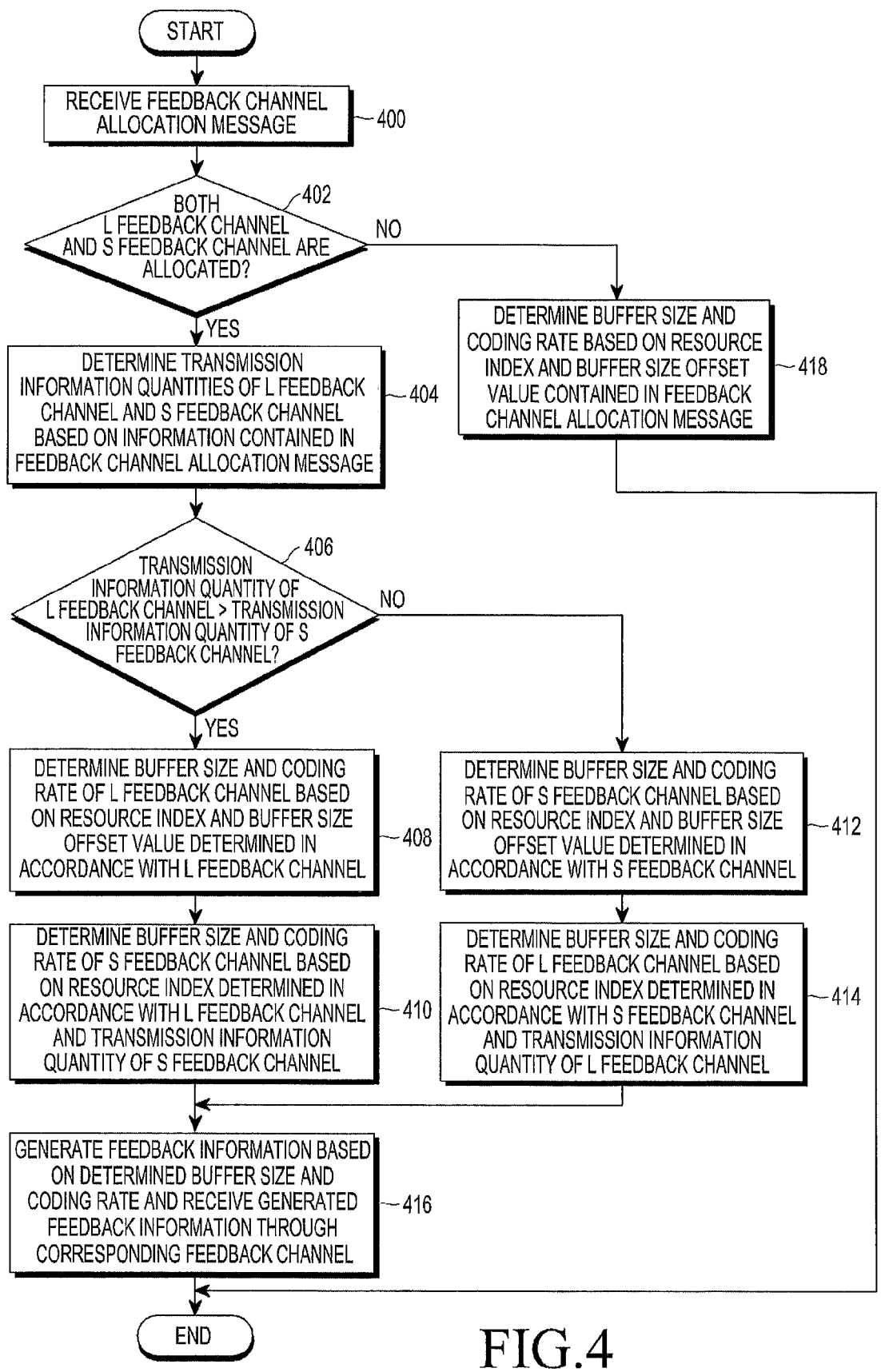
FIG. 4 is a flowchart illustrating a feedback information transmitting process by a mobile terminal according to an embodiment of the present disclosure.

FIG. 4 is a flowchart illustrating a feedback information transmitting process by the mobile terminal according to an embodiment of the present disclosure.

Referring to FIG. 4, the mobile terminal receives the feedback channel allocation message from the base station in step 400. Further, the mobile terminal determines whether both the L feedback channel and the S feedback channel are allocated based on information (for example, "period" in Table 1") contained in the feedback channel allocation message in step 402.

When both the L feedback channel and the S feedback channel are allocated, the mobile terminal determines the transmission information quantity of the L feedback channel and the transmission information quantity of the S feedback channel based on information (for example, "MFM_bitmap" and "MFM_allocation_index" in Table 1) contained in the feedback channel allocation message in step 404.

Further, the mobile terminal determines whether the transmission information quantity of the L feedback channel is larger than the transmission information quantity of the S feedback channel in step 406.

When the transmission information quantity of the L feedback channel is larger than the transmission information quantity of the S feedback channel, the mobile terminal proceeds to step 408 and determines the buffer size and the coding rate of the L feedback channel based on the resource index and buffer size offset value determined in accordance with the L feedback channel. Subsequently, the mobile terminal proceeds to step 410 and determines the buffer size and the coding rate of the S feedback channel based on the resource index determined in accordance with the L feedback channel and the transmission information quantity of the S feedback channel.

Meanwhile, when the transmission information quantity of the L feedback channel is not larger than the transmission information quantity of the S feedback channel, the mobile terminal proceeds to step 412 and determines the buffer size and the coding rate of the S feedback channel based on the resource index and buffer size offset value determined in accordance with the S feedback channel. Subsequently, the mobile terminal proceeds to step 414 and determines the buffer size and the coding rate of the L feedback channel based on the resource index determined in accordance with the S feedback channel and the transmission information quantity of the L feedback channel.

When the buffer sizes and the coding rates are determined as described above, the mobile terminal generates the feedback information based on the determined buffer sizes and coding rates and transmits the generated feedback information through the corresponding feedback channel in step 416.

Meanwhile, when both the L feedback channel and the S feedback channel are not allocated in step 402, that is, when one of the L feedback channel and the S feedback channel is allocated, the mobile terminal determines the buffer size and the coding rate based on the resource index and the buffer size offset value contained in the feedback channel allocation message in step 418 and performs step 416.

Hereinafter, internal configurations of the base station and the mobile terminal will be described with reference to FIGS. 5 and 6, respectively.

Figure 5:
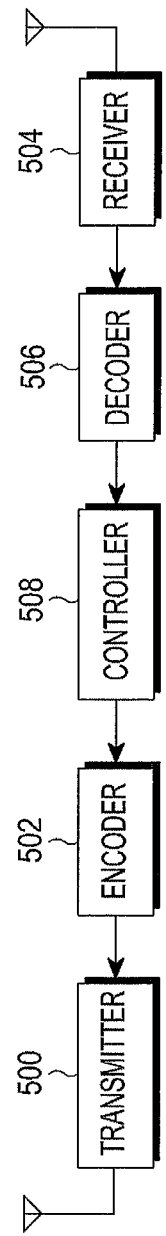
FIG. 5 is a block diagram of a base station according to an embodiment of the present disclosure.

FIG. 5 is a block diagram of the base station according to an embodiment of the present disclosure.

Referring to FIG. 5, the base station includes a transmitter 500, an encoder 502, a receiver 504, a decoder 506, and a controller 508.

The transmitter 500 transmits signals such as downlink data, control information, and feedback channel allocation information to the mobile terminal. The encoder 502 encodes a signal to be transmitted, and outputs the encoded signal to the transmitter 500.

The receiver 504 receives signals such as uplink data and feedback information from the mobile terminal. Further, the decoder 506 decodes the received signal and then outputs a result thereof to the controller 508.

The controller 508 controls general operations of the base station by controlling the transmitter 500, the encoder 502, the receiver 504, and the decoder 506. Particularly, according to an embodiment of the present disclosure, the controller 508 performs the following operations.

The controller 508 determines information to be fed back by the mobile terminal in accordance with the feedback channel to be allocated. Further, the controller 508 determines whether to allocate both the L feedback channel and the S feedback channel as the feedback channel to be allocated.

When both the L feedback channel and the S feedback channel are allocated, the controller 508 compares the transmission information quantity of the L feedback channel and the transmission information quantity of the S feedback channel. Further, the controller 508 determines a resource index and a buffer size offset value in accordance with the feedback channel having the larger transmission information quantity and generates the feedback channel allocation message containing the determined resource index and buffer size offset value. Subsequently, the controller 508 outputs the generated feedback channel allocation message to the encoder 502 to allow the generated feedback channel allocation message to be encoded and transmitted to the mobile terminal.

Meanwhile, when both the L feedback channel and the S feedback channel are not allocated, that is, when one of the L feedback channel and the S feedback channel is allocated, the controller 508 determines the resource index and the buffer size offset value based on the channel state and the transmission information quantity of the corresponding feedback channel. Further, the controller 508 generates the feedback channel allocation message containing the determined resource index and buffer size offset value. Subsequently, the controller 508 outputs the generated feedback channel allocation message to the encoder 502 to allow the generated feedback channel allocation message to be encoded and transmitted to the mobile terminal.

Meanwhile, when the controller 508 receives feedback information through the allocated feedback channel after the feedback channel allocation message is transmitted, the controller 508 performs the following operations. When both the L feedback channel and the S feedback channel are allocated to the mobile terminal, the controller 508 compares the transmission information quantity of the L feedback channel and the transmission information quantity of the S feedback channel. The controller 508 determines whether the transmission information quantity of the L feedback channel is larger than the transmission information quantity of the S feedback channel.

When the transmission information quantity of the L feedback channel is larger than the transmission information quantity of the S feedback channel, the controller 508 determines the buffer size and the coding rate of the L feedback channel based on the resource index and buffer size offset value determined in accordance with the L feedback channel. Subsequently, the controller 508 determines the buffer size and the coding rate of the S feedback channel based on the resource index determined in accordance with the L feedback channel and the transmission information quantity of the S feedback channel.

Meanwhile, when the transmission information quantity of the L feedback channel is not larger than the transmission information quantity of the S feedback channel, the controller 508 determines the buffer size and the coding rate of the S feedback channel based on the resource index and buffer size offset value determined in accordance with the S feedback channel. Further, the controller 508 determines the buffer size and the coding rate of the L feedback channel based on the resource index determined in accordance with the S feedback channel and the transmission information quantity of the L feedback channel.

The controller 508 determines whether the received feedback information is information of the L feedback channel. When the received feedback information is the information of the L feedback channel, the controller 508 controls the decoder 506 such that the received feedback information is decoded using the determined buffer size and coding rate of the L feedback channel.

When the received feedback information is not the information of the L feedback channel, that is, when the received feedback information is information of the S feedback channel, the controller 508 controls the decoder 506 such that the received feedback information is decoded using the determined buffer size and coding rate of the S feedback channel.

Meanwhile, when both the L feedback channel and the S feedback channel are not allocated, that is, when one of the L feedback channel and the S feedback channel is allocated, the controller 508 controls the decoder 506 such that the received feedback information is decoded using the buffer size and the coding rate according to the resource index and buffer size offset value determined based on the channel state and the transmission information quantity of the corresponding feedback channel.

Figure 6:
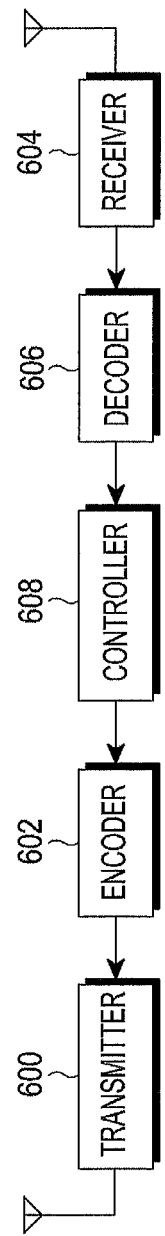
FIG. 6 is a block diagram of a mobile terminal according to an embodiment of the present disclosure.

FIG. 6 is a block diagram of the mobile terminal according to an embodiment of the present disclosure.

Referring to FIG. 6, the mobile terminal includes a transmitter 600, an encoder 602, a receiver 604, a decoder 606, and a controller 608.

The transmitter 600 transmit signals such as uplink data and feedback information to the base station. The encoder 602 encodes a signal to be transmitted, and outputs the encoded signal to the transmitter 600.

The receiver 604 receives signals such as downlink data, control information, and feedback channel allocation information from the base station. Further, the decoder 606 decodes the received signal and then outputs a result thereof to the controller 608.

The controller 608 controls general operations of the mobile terminal by controlling the transmitter 600, the encoder 602, the receiver 604, and the decoder 606. Particularly, according to an embodiment of the present disclosure, the controller 608 performs the following operations.

The controller 608 receives the feedback channel allocation message from the base station. Further, the mobile terminal determines whether both the L feedback channel and the S feedback channel are allocated based on information (for example, "period" in Table 1) contained in the feedback channel allocation message.

When both the L feedback channel and the S feedback channel are allocated, the controller 608 determines the transmission information quantity of the L feedback channel and the transmission information quantity of the S feedback channel based on information (for example, "MFM_bitmap" and "MFM_allocation_index" in Table 1) contained in the feedback channel allocation message. Further, the controller 608 determines whether the transmission information quantity of the L feedback channel is larger than the transmission information quantity of the S feedback channel.

When the transmission information quantity of the L feedback channel is larger than the transmission information quantity of the S feedback channel, the controller 608 determines the buffer size and the coding rate of the L feedback channel based on the resource index and buffer size offset value determined in accordance with the L feedback channel. Subsequently, the controller 608 determines the buffer size and the coding rate of the S feedback channel based on the resource index determined in accordance with the L feedback channel and the transmission information quantity of the S feedback channel.

Meanwhile, when the transmission information quantity of the L feedback channel is not larger than the transmission information quantity of the S feedback channel, the controller 608 determines the buffer size and the coding rate of the S feedback channel based on the resource index and buffer size offset value determined in accordance with the S feedback channel. Subsequently, the controller 608 determines the buffer size and the coding rate of the L feedback channel based on the resource index determined in accordance with the S feedback channel and the transmission information quantity of the L feedback channel.

When the buffer sizes and the coding rates are determined as described above, the controller 608 generates the feedback information based on the determined buffer sizes and coding rates and transmits the generated feedback information through the corresponding feedback channel.

Meanwhile, when both the L feedback channel and the S feedback channel are not allocated, that is, when one of the L feedback channel and the S feedback channel is allocated, the controller 608 determines the buffer size and the coding rate based on the resource index and the buffer size offset value contained in the feedback channel allocation message.

The embodiment of the present disclosure provides a method and an apparatus which use the lower coding rate for the feedback channel corresponding to the smaller transmission information quantity between the L feedback channel and the S feedback channel by considering the transmission information quantities of the L feedback channel and the S feedback channel.

However, another embodiment of the present disclosure may fixedly use the resource index and the buffer size offset value for the S feedback channel, and the resource index and the corresponding transmission information quantity for the S feedback channel without comparing the transmission information quantities of the L feedback channel and the S feedback channel.

The embodiment of the present disclosure uses the fact that the transmission information quantity of the L feedback channel is generally smaller than the transmission information quantity of the S feedback channel, so it has an advantage of not applying all the various cases according to the S feedback channel. Since there are not many types of L feedback channels, the coding rate and the buffer size can be determined using a preset table (for example, a table showing the coding rate and the buffer size offset value for each L feedback channel).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to allocate feedback channels by a base station in a wireless communication system, the method comprising:
    determining a first quantity of information to be fed back via a first feedback channel and a second quantity of information to be fed back via a second feedback channel, the first feedback channel and the second feedback channel being allocated to a mobile terminal;
    generating feedback control information used to determine a coding rate based on the first and second quantities of information for the first feedback channel and the second feedback channel; and
    transmitting, to the mobile terminal, a feedback channel allocation message including the feedback control information and information on the first feedback channel and the second feedback channel.

2. The method of claim 1, wherein generating the feedback control information comprises:
    determining a larger feedback channel having a larger quantity of information to be fed back by the mobile terminal between the first feedback channel and the second feedback channel; and
    generating the feedback control information in accordance with the larger feedback channel.

3. The method of claim 2, wherein the feedback control information includes resource information used to transmit feedback information and an offset value used to determine a buffer size.

4. The method of claim 3, wherein, when the larger feedback channel is the first feedback channel, the feedback information received using the first feedback channel is decoded using a buffer size and a coding rate of the first feedback channel determined based on the resource information and the offset value.

5. The method of claim 3, wherein, when the larger feedback channel is the second feedback channel, the feedback information received using the second feedback channel is decoded using a buffer size and a coding rate of the second feedback channel determined based on resource information and an offset value according to the second quantity of information to be fed back by the mobile terminal via the second feedback channel.

6. A method to transmit feedback information by a mobile terminal in a wireless communication system, the method comprising:
    receiving, from a base station, a feedback channel allocation message including feedback control information and information on a first feedback channel and a second feedback channel being allocated to the mobile terminal; and
    transmitting feedback information to the base station using the feedback channel allocation message,
    wherein the feedback control information is used to determine a coding rate and is generated based on a first quantity of information to be fed back via the first feedback channel and a second quantity of information to be fed back via the second feedback channel.

7. The method of claim 6, wherein the feedback control information is information generated in accordance with a larger feedback channel having a larger quantity of information to be fed back by the mobile terminal between the first feedback channel and the second feedback channel.

8. The method of claim 7, wherein the feedback control information includes resource information used to transmit the feedback information and an offset value used to determine a buffer size.

9. The method of claim 8, wherein transmitting the feedback information to the base station comprises:
    when the larger feedback channel is the first feedback channel, encoding the feedback information using a buffer size and a coding rate of the first feedback channel determined based on the resource information and the offset value in order to transmit the feedback information using the first feedback channel; and
    transmitting the encoded feedback information to the base station.

10. The method of claim 8, wherein transmitting the feedback information to the base station comprises:
    when the larger feedback channel is the second feedback channel, encoding the feedback information using a buffer size and a coding rate of the second feedback channel in order to transmit the feedback information using the second feedback channel; and
    transmitting the encoded feedback information to the base station,
    wherein the buffer size and the coding rate of the second feedback channel are determined based on the resource information and the offset value according to the second quantity of information to be fed back by the mobile terminal via the second feedback channel.

11. A base station in a wireless communication system, the base station comprising:
    a controller configured to determine a first quantity of information to be fed back via a first feedback channel and a second quantity of information to be fed back via a second feedback channel, and to generate feedback control information used to determine a coding rate based on the first and second quantities of information for the first feedback channel and the second feedback channel, the first feedback channel and the second feedback channel being allocated to a mobile terminal; and
    a transmitter configured to transmit, to the mobile terminal, a feedback channel allocation message including the feedback control information and information on the first feedback channel and the second feedback channel.

12. The base station of claim 11, wherein the controller is configured to determine a larger feedback channel having a larger quantity of information to be fed back by the mobile terminal from the first feedback channel and the second feedback channel, and to generate the feedback control information in accordance with the larger feedback channel.

13. The base station of claim 12, wherein the feedback control information includes resource information used to transmit feedback information and an offset value used to determine a buffer size.

14. The base station of claim 13, when the larger feedback channel is the first feedback channel, the feedback information received using the first feedback channel is decoded using a buffer size and a coding rate of the first feedback channel determined based on the resource information and the offset value.

15. The base station of claim 13, wherein, when the larger feedback channel is the second feedback channel, the feedback information received using the second feedback channel is decoded using a buffer size and a coding rate of the second feedback channel determined based on resource information and an offset value according to the second quantity of information to be fed back by the mobile terminal via the second feedback channel.

16. A mobile terminal in a wireless communication system, the mobile terminal comprising:
a receiver configured to receive, from a base station, a feedback channel allocation message comprising feedback control information and information on a first feedback channel and a second feedback channel being allocated to the mobile terminal; and
a transmitter configured to transmit feedback information to the base station using the feedback channel allocation message,
wherein the feedback control information is used to determine a coding rate and is generated based on a first quantity of information to be fed back via the first feedback channel and a second quantity of information to be fed back via the second feedback channel.

17. The mobile terminal of claim 16, wherein the feedback control information is information generated in accordance with a larger feedback channel having the larger quantity of information to be fed back by the mobile terminal between the first feedback channel and the second feedback channel.

18. The mobile terminal of claim 17, wherein the feedback control information includes resource information used to transmit the feedback information and an offset value used to determine a buffer size.

19. The mobile terminal of claim 18, further comprising:
an encoder configured to encode the feedback information using a buffer size and a coding rate of the first feedback channel determined based on the resource information and the offset value in order to transmit the feedback information using the first feedback channel when the larger feedback channel is the first feedback channel,
wherein the transmitter is configured to transmit the encoded feedback information to the base station.

20. The mobile terminal of claim 18, further comprising:
an encoder configured to encode the feedback information using a buffer size and a coding rate of the second feedback channel in order to transmit the feedback information using the second feedback channel when the larger feedback channel is the second feedback channel,
wherein the transmitter is configured to transmit the encoded feedback information to the base station, and
wherein the buffer size and the coding rate of the second feedback channel are determined based on the resource information and the offset value according to the second quantity of information to be fed back by the mobile terminal via the second feedback channel.

* * * * *